(12) United States Patent
Salvador et al.

(10) Patent No.: US 8,445,145 B2
(45) Date of Patent: May 21, 2013

(54) STACK SHUTDOWN PURGE METHOD

(75) Inventors: John P. Salvador, Penfield, NY (US); Craig S. Gittleman, Rochester, NY (US); Gerald E. Voecks, La Crescenta, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 1316 days.

(21) Appl. No.: 11/534,272

(22) Filed: Sep. 22, 2006

(65) Prior Publication Data
US 2008/0075986 A1 Mar. 27, 2008

(51) Int. Cl.
*H01M 8/00* (2006.01)

(52) U.S. Cl.
USPC ............ 429/408; 429/400; 429/444; 429/443

(58) Field of Classification Search
USPC .................................. 429/408, 400, 443, 444
See application file for complete search history.

(56) References Cited

U.S. PATENT DOCUMENTS

| | | | |
|---|---|---|---|
| 5,945,370 A * | 8/1999 | Yokoi et al. | 502/304 |
| 2002/0076582 A1 | 6/2002 | Reiser et al. | |
| 2002/0076583 A1 | 6/2002 | Reiser et al. | |
| 2002/0098393 A1 | 7/2002 | Dine et al. | |
| 2002/0102443 A1 | 8/2002 | Yang et al. | |
| 2004/0081866 A1 | 4/2004 | Bekkedahl et al. | |
| 2004/0226218 A1 * | 11/2004 | Izawa et al. | 48/127.9 |
| 2006/0035122 A1 | 2/2006 | Weissman et al. | |
| 2006/0068249 A1 * | 3/2006 | Fredette | 429/22 |

FOREIGN PATENT DOCUMENTS

| | | |
|---|---|---|
| JP | 60065471 | 4/1985 |
| JP | 2004362915 A | 12/2004 |
| JP | 2005267898 A | 9/2005 |
| WO | 2004040686 | 5/2004 |

OTHER PUBLICATIONS

English Translation of First Office Action, JP2007-243510; Dated: Feb. 7, 2011; 3 pages.

* cited by examiner

*Primary Examiner* — Jane Rhee
(74) *Attorney, Agent, or Firm* — BrooksGroup

(57) ABSTRACT

A method of purging residual hydrogen from a fuel cell stack is disclosed. The method includes providing an air stream, providing a temporary nitrogen stream by removing oxygen from the air stream with an adsorbent bed and passing the nitrogen stream through the fuel cell stack.

17 Claims, 4 Drawing Sheets

STACK SHUTDOWN PURGE METHOD

TECHNICAL FIELD

The disclosure generally relates to a method for purging hydrogen from a fuel cell stack after fuel cell shutdown.

BACKGROUND

Fuel cell technology is a relatively recent development in the automotive industry. It has been found that fuel cell power plants are capable of achieving efficiencies over 55%. Furthermore, fuel cell power plants emit only heat and water as by-products.

Fuel cells include three components: a cathode, an anode and an electrolyte which is sandwiched between the cathode and the anode and permits the transmission of protons from the anode to the cathode. Each electrode contains a catalyst. In operation, the catalyst on the anode splits hydrogen into electrons and protons. The electrons are distributed as electric current from the anode, transmitted externally through some work-related device, such as a drive motor, and then to the cathode. The protons migrate from the anode, through the electrolyte to the cathode. The catalyst on the cathode combines the protons with electrons returning from the work-related device and oxygen from the air to form water. A fuel cell stack is a collection of individual fuel cells stacked together in series.

During operation of the fuel cell stack, a steady flow of hydrogen gas is introduced into the anode side of the fuel cell stack, and a steady flow of air is introduced into the cathode side of the fuel cell stack. Upon shutdown of the fuel cell stack, flow of hydrogen into the anode side of the fuel cell stack is terminated. If hydrogen remains in the fuel cell stack after shutdown, air leaking into the anode could cause the formation of a localized corrosion cell. The cathode potential with respect to a standard hydrogen electrode can reach 1.2-1.5 V. Over time, the high voltage will result in the loss of the carbon substrate supporting the catalyst in the cathode. A loss of substrate and catalyst area will reduce operating voltage, and ultimately limit stack life. This problem is described in patent US 2004/0081866A1 (Bekkedahl et al.)

SUMMARY OF EXEMPLARY EMBODIMENTS OF THE INVENTION

One embodiment of the invention may include a process of reducing fuel cell stack cathode degradation comprising providing a vehicle with a fuel cell stack including an anode reactant gas flow path defined therein and a cathode reactant gas flow path defined therein and wherein a reactant gas is in the anode reactant gas flow path, providing a system on board the vehicle for providing a nitrogen-rich gas stream, purging the reactant in the anode reactant gas flow path comprising flowing the nitrogen-rich gas stream through the anode reactant gas flow path.

One embodiment of the invention may include a process of purging residual hydrogen from a fuel cell stack after operational shutdown of the fuel cell or both after shutdown and during initial startup of the fuel cell. In one embodiment, the method may include diverting an air stream through an adsorbent bed to remove oxygen from the air stream and delivering the resulting nitrogen stream through the anode side of the fuel cell stack to remove the residual hydrogen from the stack. The adsorbent material may be regenerated by distributing a stream of hydrogen through the adsorbent bed to desorb the oxygen from the adsorbent and sweep it into the hydrogen stream. The resulting hydrogen/oxygen gas mixture stream, which is neither flammable nor hypergolic, may be directed through the anode side of the fuel cell stack or through some other outlet. During re-generation of the adsorbent material, heat may be applied to the adsorbent material to increase the oxygen desorption rate.

In another embodiment, the adsorbent material may be regenerated by delivering a hot (60° C.-80° C.), low oxygen concentration stream of the cathode exhaust from the cathode side of the fuel cell stack, or an alternative oxygen-free gas stream, through the adsorbent bed.

In another embodiment, the adsorbent may be a chemisorbent material such as cerium oxide (CeO). Air may be distributed through the adsorbent bed so that oxygen in the air reacts with the CeO to form $CeO_2$. This results in a pure nitrogen stream which may be distributed through the anode side of the fuel cell stack to remove the residual hydrogen from the stack. The adsorbent bed may be re-generated typically by distributing a stream of hydrogen through the adsorbent bed, such that the hydrogen reduces the $CeO_2$ back to CeO, forming water as a by-product. Heat may be applied to the adsorbent bed, and/or incorporation of a catalyst on or in the adsorbent bed may be considered, to facilitate this endothermic reaction.

In another embodiment, for a brief period of time during start-up of the fuel cell, an air stream may be distributed through the adsorbent bed to remove oxygen from the air stream. The resulting nitrogen stream may be distributed through the anode side of the fuel cell stack to remove the residual oxygen from the stack. During fuel cell shutdown, the adsorbent material may be re-generated by distributing a stream of hydrogen through the adsorbent bed.

In another embodiment, two separate adsorbent beds are provided. After fuel cell shutdown, an air stream may be diverted through the first adsorbent bed to remove oxygen from the air stream. The resulting nitrogen stream may be distributed through the anode side of the fuel cell stack to remove residual hydrogen from the stack. During initial startup of the fuel cell, the air stream may be diverted through the second adsorbent bed to generate a nitrogen stream which may be briefly distributed through the anode side of the fuel cell stack. Both the first and second adsorbent beds may then be simultaneously re-generated after startup of the fuel cell stack.

Other exemplary embodiments of the present invention will become apparent from the detailed description provided hereinafter. It should be understood that the detailed description and specific examples, while indicating the exemplary embodiments of the invention, are intended for purposes of illustration only and are not intended to limit the scope of the invention.

BRIEF DESCRIPTION OF THE DRAWINGS

The invention will now be described, by way of example, and not limitation, with reference to the accompanying drawings. The following is a brief description of the drawings.

DETAILED DESCRIPTION OF THE INVENTION

One embodiment of the invention may include a process of reducing fuel cell stack cathode degradation comprising providing a vehicle with a fuel cell stack including an anode reactant gas flow path defined therein and a cathode reactant gas flow path defined therein and wherein a reactant gas is in the anode reactant gas flow path, providing a system on board the vehicle for providing a nitrogen-rich gas stream, purging the reactant gas in the anode reactant gas flow path comprising flowing the nitrogen-rich gas stream through the anode reactant gas flow path. The nitrogen-rich stream may be substantially free of oxygen. Alternatively, the nitrogen-rich stream includes less than 2 weight percent oxygen. In another embodiment of the invention, producing a nitrogen-rich stream comprises flowing an air stream through an oxygen adsorbent material to remove at least a substantial portion of the oxygen from the air and to increase the concentration of nitrogen.

Figure 1:
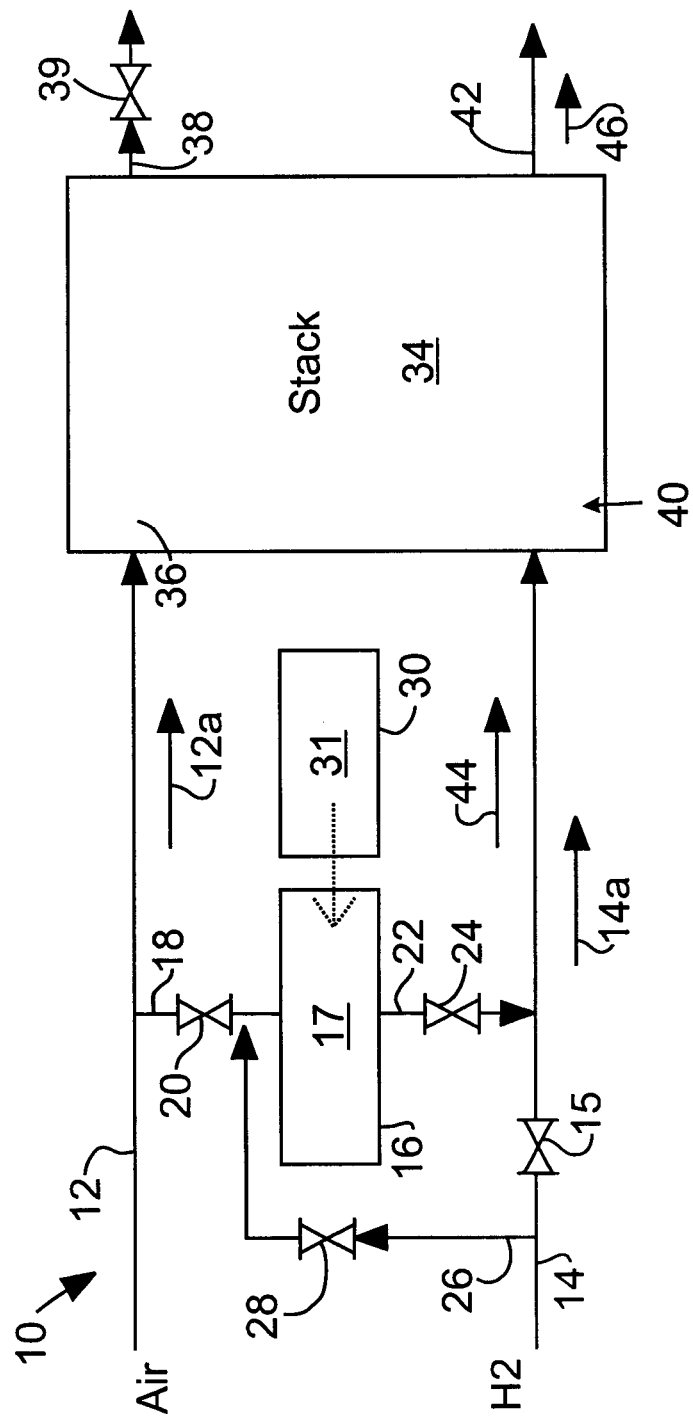
FIG. 1 is a schematic view of a fuel cell hydrogen purge system suitable for implementation of a method according to one or more embodiments of the invention.

Referring now to FIG. 1, one embodiment of the invention may include a fuel cell hydrogen purge system generally indicated by reference numeral 10. The system 10 is suitable for use in a fuel cell vehicle or in non-motive applications. The system 10 may include an air flow line 12 connected to the cathode side 36, which is provided to the cathodes (not shown), of a fuel cell stack 34, which may be conventional. A hydrogen flow line 14 is connected to the anode side 40, which is provided to the anodes (not shown), of the fuel cell stack 34. Polymer electrolyte membranes (not shown) in the fuel cell stack 34 separate the cathodes from the anodes throughout the stack. A cathode exhaust line 38 extends from the cathode side 36 of the fuel cell stack 34, and an anode exhaust line 42 extends from the anode side 40 of the fuel cell stack 34. During operation of the fuel cell stack 34, the air flow line 12 provides for the delivery of an air stream 12a to the cathode side 36, whereas the hydrogen flow line 14 provides for the delivery of a hydrogen stream 14a to the anode side 40, of the fuel cell stack 34. Cathode exhaust is removed from the fuel cell stack 34 through the cathode exhaust line 38, whereas anode exhaust is removed from the fuel cell stack 34 through the anode exhaust line 42.

An adsorber inlet line 18 having an adsorber inlet valve 20 extends from the air flow line 12. Line 18 extends from the inlet valve 20 to the adsorber 16. The adsorber 16 contains an adsorbent material 17. An adsorber outlet line 22 having an adsorber outlet valve 24 extends from the outlet of the adsorber bed 16. An adsorbent heater 30 may be provided in thermal contact with the adsorbent material 17 in the adsorber 16 for applying heat 31 to the adsorbent material 17, as will be hereinafter further described. In various embodiments of the invention, the adsorbent heater 30 may be, for example, an electric heat source; a heat exchanger connected to a warm stream of fluid such as stack coolant; or a heated gas stream.

A hydrogen shunt line 26 having a hydrogen shunt valve 28 branches from the hydrogen flow line 14. The outlet end of the hydrogen shunt line 26 is provided in fluid communication with the adsorber inlet line 18a that is located downstream of the adsorber inlet valve 20.

In operation of the system 10 according to one embodiment of the invention, the hydrogen shunt valve 28, the adsorber inlet valve 20 and the adsorber outlet valve 24 are closed during operation of the fuel cell stack 34. An air stream 12a flows through the air flow line 12 and into the cathode side 36 of the fuel cell stack 34. Simultaneously, a hydrogen stream 14a flows through the hydrogen flow line 14 and into the anode side 40 of the fuel cell stack 34. At the anode side 40, hydrogen from the hydrogen stream 14a is electrochemically separated into electrons and protons. The electrons are distributed as electric current from the anode, sent externally through electrically-driven devices, such as a drive motor (not shown), and then returned to the cathode in the cathode side 36. The protons migrate from the anode, through the polymer electrolyte membrane, to the cathode. At the cathode side 36, the protons combine with (1) the electrons returning from the electrically-driven devices and (2) oxygen from the air stream 12a, to form water and heat. The water is discharged, entrained with the vitiated air, as water vapor through the cathode exhaust line 38. Excess hydrogen is discharged from the anode side 40 through the anode exhaust line 42.

During shutdown of the fuel cell stack 34, the hydrogen flow valve 15 is closed to prevent further flow of the hydrogen stream 14a to the anode side 40 of the fuel cell stack 34. The adsorber inlet valve 20 and adsorber outlet valve 24 are opened, allowing the air stream 12a to flow from the air flow line 12, through the adsorber inlet line 18 and into the adsorber 16, respectively.

As the air stream 12a flows through the adsorber 16, oxygen in the air stream 12a is adsorbed onto the surfaces of the adsorbent material 17. Thus, most of the oxygen is removed from the air stream 12a during the initial contact period. Consequently, a substantially pure nitrogen stream 44 flows from the outlet of the adsorber 16, through the adsorber outlet line 22 and into the hydrogen flow line 14, respectively. From the hydrogen flow line 14, the nitrogen stream 44 flows through the anode side 40 of the fuel cell stack 34, thereby purging residual hydrogen from the fuel cell stack 34. The resulting mixed nitrogen-hydrogen stream 46 is discharged from the fuel cell stack 34 through the anode exhaust line 42.

Figure 4:
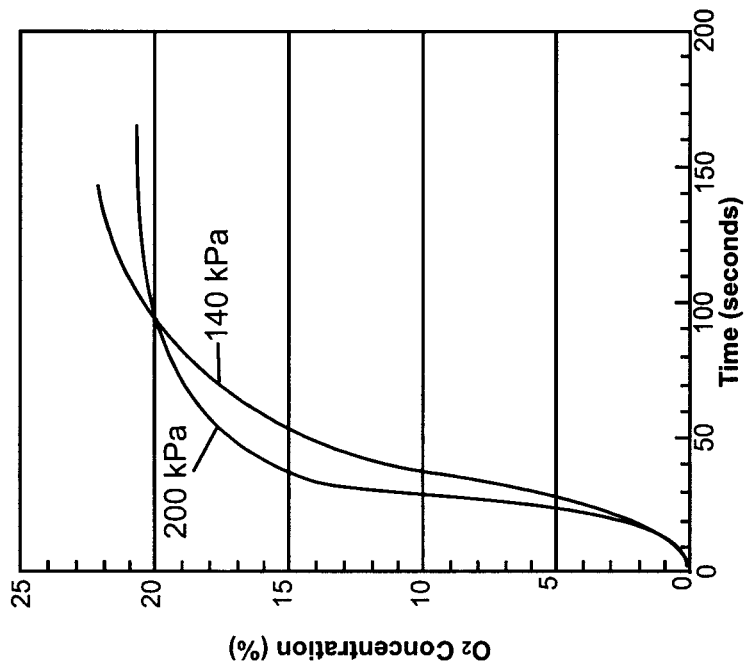
FIG. 4 is a graph of an oxygen breakthrough curve, illustrating changes in oxygen concentration over time of the gas stream leaving an oxygen adsorbing bed as air is fed into the adsorbent bed.

After the air stream 12a has flowed through the adsorber 16 for some period of time, the adsorbent material 17 becomes saturated with oxygen. At that point, little or no oxygen is removed from the air stream 12a as it passes through the adsorbent bed 17. Consequently, the air stream 12a, now stream 44 which is substantially without oxygen removed therefrom, flows through the adsorber outlet line 22, the hydrogen flow line 14 and into the anode side 40 of the fuel cell stack 34, respectively. As shown in the graph of FIG. 4, the concentration of oxygen in the nitrogen stream 44 steadily increases with time for a given flow rate of the air stream 12a. Other factors influencing the rate of oxygen breakthrough include the volume of adsorbent material, temperature, pressure, and the adsorbent material 17 selected. Higher flow velocities of the air stream 44 result in a more rapid increase in oxygen concentration. The adsorber 16 may be sized in such a manner that the oxygen concentration in the nitrogen stream 44 is kept sufficiently low until after a sufficient quantity of nitrogen has flowed through the anode side 40 of the fuel cell stack 34 to purge the majority of hydrogen from the fuel cell stack 34. This prevents formation of localized corrosion cells in the fuel cell stack 34, thus greatly increasing stack life.

Since it needs only to provide sufficient quantities of nitrogen to evacuate residual hydrogen from the anode side 40 of the fuel cell stack 34, the adsorber 16 can be relatively small (less than 4 liters). Furthermore, the adsorber 16 can be used regardless of the anode hydrogen delivery mechanism. For example, the adsorber 16 will function with an anode recycle loop (in which hydrogen is recycled from the anode exhaust line 42 to the stack anode inlet, via either a hydrogen pump or an ejector), a single pass flow strategy (in which gases are only distributed through the stack one time), or with other flow strategies. The adsorber 16 can also be combined with shutdown strategies to improve corrosion resistance, such as by placing an electrical load on the stack with the air source turned off to reduce the oxygen content in the cathode prior to introducing the oxygen-depleted nitrogen flow 44 into the anode side 40.

After the residual hydrogen has been evacuated from the fuel cell stack 34, the adsorbent material 17 in the adsorber 16 is re-generated, either during operation of the fuel cell stack 34 or when the fuel cell stack 34 is not in operation. The re-generation strategy depends on the particular type of adsorbent material 17 used in the adsorber 16. For example, after operation of the fuel cell stack 34 has been resumed and the hydrogen stream 14a flows to the anode side 40, the hydrogen shunt valve 28 and adsorber outlet valve 24 are opened, whereas the adsorber inlet valve 20 and hydrogen flow valve 15 are closed. This allows the hydrogen stream 14a to flow from the hydrogen flow line 14 and through the hydrogen shunt line 26, adsorber inlet line 18, adsorber 16, adsorber outlet line 22 and again through hydrogen flow line 14, respectively. The oxygen which was previously adsorbed onto the adsorbent material 17 is then desorbed into the hydrogen stream 14a, which is distributed through the anode side 40 of the fuel cell stack 34. The desorbed oxygen represents only a small fraction of the hydrogen stream 14a (mixture is non-hypergolic and non-flammable) as the hydrogen stream 14a enters the anode side 40. The oxygen is generally consumed by the hydrogen on the catalyst surface in the anode. Since the fuel cell stack is operating normally under load, the anode potential is set by the bulk hydrogen properties in the anode. The desorbed oxygen does not create a cathode corrosion risk.

The adsorbent material 17 in the adsorber 16 may be any material known by those skilled in the art which is suitable for adsorbing oxygen from an air stream. For example, the adsorbent material 17 may be a sieve such as a carbon-molecular sieve.

Figure 5:
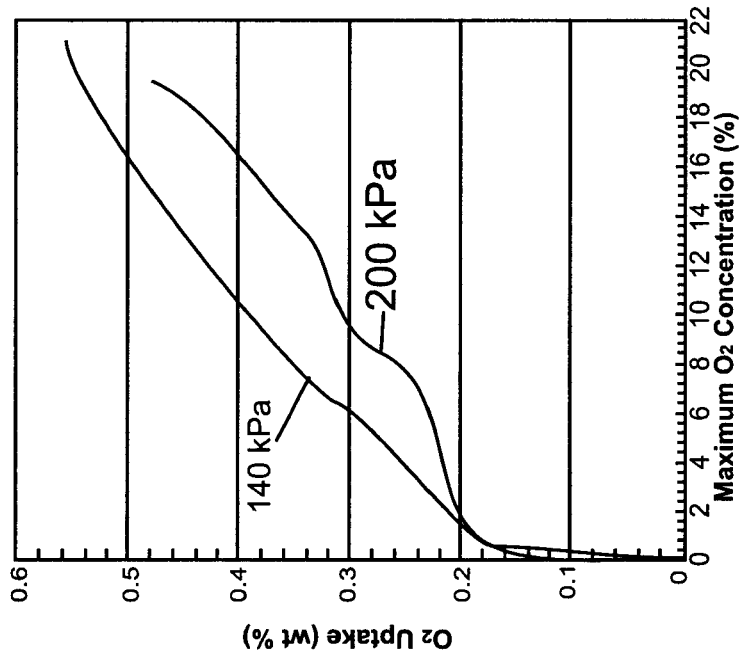
FIG. 5 is a graph illustrating oxygen-uptake capacity as a function of the oxygen concentration in the purified nitrogen gas for a typical adsorbent material used according to one embodiment of the invention.

FIG. 5 illustrates oxygen-uptake capacity for a typical adsorbent material used according to one embodiment and can be used to estimate the oxygen storage capacity of the material for a given oxygen outlet concentration. The quantity of adsorbent material 17 required in the adsorber 16 depends on the volume requirements of the anode subsystem, the flow rate of the air stream 12a, and the particular adsorbent material 17 used. For a nominal 100 kW fuel cell stack, for example, an adsorbent material 17 having the oxygen uptake properties shown in FIG. 5 would require a volume of 4 L (2.8 kg) to provide two anode subsystem volume exchanges of nitrogen gas containing less than 1% oxygen. If an oxygen content of 5% in the nitrogen stream 44 is acceptable, then only 2.5 L (1.8 kg) of the adsorbent material 17 is required.

Depending on the adsorbent material 17 used, the adsorbent material 17 can be maintained at a relatively low temperature (for example, atmospheric temperature) until the air stream 12a is distributed through the adsorber 16. For many adsorbent materials 17, maintaining the material at a relatively low temperature would improve the oxygen-adsorbing capacity of the adsorbent material 17. During the subsequent adsorbent regeneration step, in which the hydrogen stream 14a is diverted through the adsorber 16 as heretofore described, the adsorbent heater 30 is operated to apply heat 31 to the adsorbent material 17. Heating the adsorbent material 17 to a temperature of typically about 80-100 degrees C. significantly improves the oxygen desorption rate. The particular temperature selected depends on the thermal and adsorption properties of the adsorbent material 17, as well as the heat source available for the adsorbent heater 30.

Figure 2:
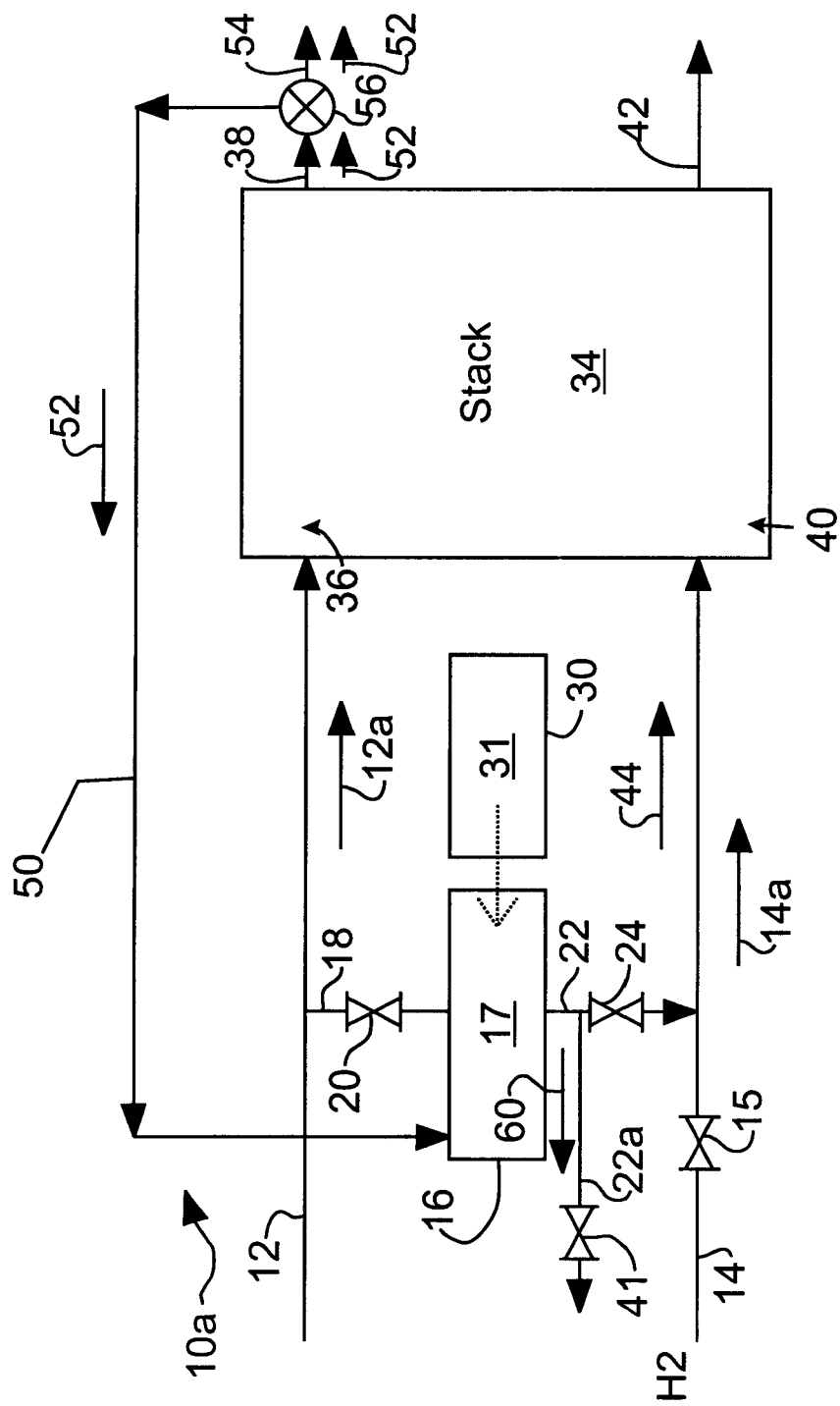
FIG. 2 is a schematic view of a fuel cell hydrogen purge system suitable for implementation of a method according to one embodiment of the invention.

Referring now to FIG. 2, one embodiment of the invention may include a fuel cell hydrogen purge system generally indicated by reference numeral 10a. The system 10a is suitable for use in a fuel cell vehicle or in non-motive applications. The system 10a is similar in design to the system 10 heretofore described with respect to FIG. 1, except the hydrogen shunt line 26 and the hydrogen shunt valve 28 may be omitted. Furthermore, the cathode exhaust line 38 is provided in fluid communication with the inlet of a three-way valve 56. An exhaust discharge line 54 extends from one outlet of the three-way valve 56, and a cathode exhaust distribution line 50 extends from the other outlet of the three-way valve 56. The discharge end of the cathode exhaust distribution line 50 is provided in fluid communication with the adsorber 16. Line 22a connects the adsorber 16 exit to an exit valve 41.

In operation of the system 10a according to one embodiment of the invention, the fuel cell stack 34 is typically operated as heretofore described with respect to FIG. 2. During operation of the fuel cell stack 34, the adsorber inlet valve 20 and adsorber outlet valve 24 are closed. Accordingly, cathode exhaust 52 flows from the cathode side 36 of the fuel cell stack 34, through the cathode exhaust line 38 and three-way valve 56, respectively, and is discharged through the exhaust discharge line 54.

After shutdown of the fuel cell stack 34, purging of residual hydrogen from the fuel cell stack 34 may be carried out as heretofore described with respect to FIG. 1, by diverting the air stream 12a through the adsorber 16 and flowing the resulting nitrogen stream 44 through the anode side 40 of the fuel cell stack 34 upon opening of the adsorber inlet valve 20 and adsorber outlet valve 24 and closing of hydrogen flow valve 15. The adsorbent material 17 in the adsorber 16 can be re-generated during subsequent operation of the fuel cell 34. Accordingly, when operation of the fuel cell 34 resumes, the three-way valve 56 blocks flow of the cathode exhaust 52 to the exhaust discharge line 54 and instead distributes the cathode exhaust 52 through the cathode exhaust distribution line 50. The adsorber outlet valve 24 remains closed, but adsorber outlet valve 41 is opened, causing flow of the cathode exhaust 52 through the adsorber 16. In the adsorber 16, the oxygen adsorbed on the adsorbent material 17 is desorbed into the cathode exhaust 52, which is vitiated air or essentially nitrogen. A mixed cathode exhaust/oxygen stream 60 then flows from the adsorber 16, through the adsorber outlet line 22 and out into the atmosphere through a vent line 22a and exhaust valve 41. Accordingly, the adsorbent material 17 is primed for additional purging of residual hydrogen from the fuel cell stack 34 after operation thereof.

Referring again to FIG. 1, operation of the system 10 according to another embodiment of the present invention may be carried out as follows. According to this method, the adsorbent material 17 is a chemisorbent material such as cerium oxide (CeO), for example. Purging of residual hydrogen from the fuel cell stack 34 is accomplished by opening the adsorber inlet valve 20 and the adsorber outlet valve 24. This allows the air stream 12a to flow from the air flow line 12 through the adsorber 16, causing oxygen in the air stream 12a to react with the solid CeO adsorbent material 17 and form solid $CeO_2$. The resulting nitrogen stream 44 flows from the adsorber 16 and through the adsorber outlet line 22, hydrogen flow line 14 and anode side 40 of the fuel cell stack 34, respectively, removing the residual hydrogen from the fuel cell stack 34 and discharging through the anode exhaust line 42. Because the conversion of CeO to $CeO_2$ is an exothermic reaction, the adsorber 16 must be appropriately designed in such a manner as to not pass the generated heat to the fuel cell stack 34 all at once.

Re-generation of the adsorbent material 17 is carried out by closing the adsorbent inlet valve 20 and hydrogen flow valve 15, and opening hydrogen shunt valve 28 and adsorber outlet valve 24, thus facilitating flow of the hydrogen stream 14a through the hydrogen shunt line 26, adsorbent inlet line 18 and adsorber 16, respectively. In the adsorber 16, hydrogen from the hydrogen stream 14a reduces the $CeO_2$ back to CeO, forming water vapor. This reaction may be accelerated by the inclusion of a catalyst, such as Pt for example, through the adsorbent CeO bed. Heat 31 for this endothermic reaction may be provided by the adsorbent heater 30. In the event that the fuel cell stack 34 remains operational during the adsorbent re-generation step, the water vapor is distributed from the adsorber 16 and through the adsorber outlet line 22, hydrogen flow line 14 and anode side 40 of the fuel cell stack 34, and is discharged through the anode exhaust line 42. On the other hand, in the event that the fuel cell stack 34 is not operational during the adsorbent-regeneration step, the water vapor bypasses the fuel cell stack 34 and is discharged through an alternative discharge outlet like vent valve 41 on FIG. 2.

Referring again to FIG. 1, operation of the system 10 according to another embodiment facilitates generation of a nitrogen stream 44 during initial start-up (typically a few seconds) of the fuel cell stack 34. Accordingly, the adsorber inlet valve 20 and adsorber outlet valve 24 are opened, whereas the hydrogen flow valve 15 and hydrogen shunt valve 28 are closed. Therefore, the air stream 12a flows from the air flow line 12 and through the adsorber 16. The resulting nitrogen stream 44 flows from the adsorber 16, through the adsorber outlet line 22 and hydrogen flow line 14, respectively, and into the anode side 40 of the fuel cell stack 34, where the nitrogen stream 44 purges residual oxygen that entered the anode 40 while the fuel cell stack was shut down from the fuel cell stack 34 and is discharged through the anode exhaust line 42. During operation of the fuel cell stack 34, the adsorber inlet valve 20, hydrogen shunt valve 28, and adsorber outlet valve 24 are closed and the hydrogen flow valve 15 is opened, facilitating flow of the air stream 12a into the cathode side 36 and flow of the hydrogen stream 14a into the anode side 40 of the fuel cell stack 34.

After start-up of the fuel cell stack 34, the adsorber 16 is re-generated by opening of the hydrogen shunt valve 28 and adsorber outlet valve 24 and closing hydrogen flow valve 15. Accordingly, the hydrogen stream 14a flows from the hydrogen flow line 14, through the hydrogen shunt line 26 and adsorbent inlet line 18, respectively, and into the adsorber 16, where oxygen is desorbed from the adsorbent material 17 into the hydrogen stream 14a. The mixed hydrogen/oxygen stream 44 flows from the adsorber 16, through the adsorber outlet line 22 and hydrogen flow line 14, respectively, and into the anode side 40 of the fuel cell stack 34. The low concentration of oxygen in the mixed hydrogen/oxygen stream will be substantially consumed on the anode catalyst. Any exhaust gas is discharged from the fuel cell stack 34 through the anode exhaust line 42. If this regeneration is conducted during shutdown, a vent line 22a and valve 41 like in FIG. 2 are required. The vent line 22a will conduct the hydrogen through valve 41 to atmosphere. In such an event, a hydrogen clean-up strategy would need to be considered.

Figure 3:
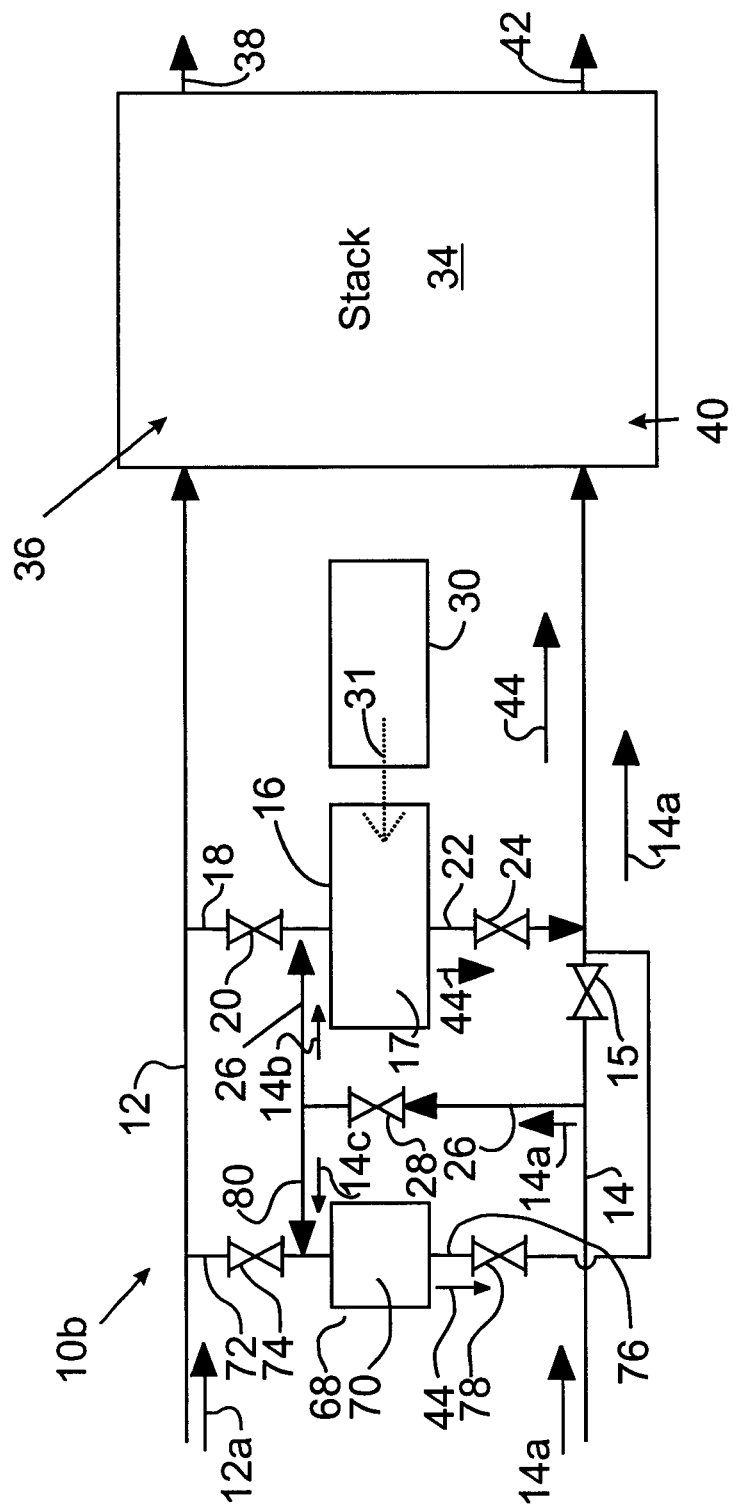
FIG. 3 is a schematic view of a fuel cell hydrogen purge system suitable for implementation of a method according to one embodiment of the invention.

Referring now to FIG. 3, a hydrogen purge system in implementation of another embodiment of the invention is generally indicated by reference numeral 10b. The system 10b is suitable for use in a fuel cell vehicle or in non-motive applications. The system 10b is similar in design to the system 10 heretofore described with respect to FIG. 1, except the system 10b includes the addition of an adsorber inlet line 72 having an adsorber inlet valve 74 extending from the air flow line 12. In addition to the first adsorber 16, a second adsorber 68, which contains an adsorbent material 70, is provided in fluid communication with the adsorber inlet line 72. An adsorber outlet line 76 having an adsorber outlet valve 78 is provided in fluid communication with the adsorber 68. The discharge end of the adsorber outlet line 76 is connected to the hydrogen flow line 14 in fluid communication. A hydrogen shunt line 80 extends from the hydrogen shunt inlet valve 28 and is connected to the adsorber inlet line 72 in fluid communication. If the system dynamics require, two hydrogen shunt valves on respective sides of line 26 may be used in place of a single hydrogen shunt valve 28.

In operation of the system 10b according to one embodiment of the invention, the fuel cell stack 34 is typically operated as heretofore described with respect to FIG. 1. During operation of the fuel cell stack 34, the adsorber inlet valve 20, adsorber outlet valve 24, adsorber inlet valve 74, adsorber outlet valve 78 and hydrogen shunt valve 28 are closed, whereas the hydrogen flow valve 15 is opened. This allows an air stream 12a to flow through the air flow line 12, into the cathode side 36 of the fuel cell stack 34 and a hydrogen stream 14a to flow through the hydrogen flow line 14, into the anode side 40 of the fuel cell stack 34.

After shutdown of the fuel cell stack 34, the adsorber inlet valve 20 and adsorber outlet valve 24 are opened and hydrogen flow valve 15 is closed, allowing the air stream 12a to flow from the air flow line 12 and through the first adsorber 16. This produces a nitrogen stream 44 which flows from the adsorber 16, through the adsorber outlet line 22 and hydrogen flow line 14, respectively, and into the anode side 40 of the fuel cell stack 34. The nitrogen stream 44 purges residual hydrogen from the anode side 40 of the fuel cell stack 34 and is discharged through the anode exhaust line 42.

For a brief period of time (typically a few seconds) during subsequent start-up of the fuel cell stack 34, the adsorber inlet valve 20 and outlet valve 24 are closed, blocking flow of the air stream 12a through the first adsorber 16. The adsorber inlet valve 74 and adsorber outlet valve 78 are opened and valve 15 is closed, allowing flow of the air stream 12a from the air flow line 12 and through the second adsorber 68, and flow of the resulting nitrogen stream 44 from the adsorber 68, and into the hydrogen flow line 14, into the anode side 40 and discharged through anode exhaust line 42. After the oxygen has been substantially displaced from the anode 40, valve 74 and valve 78 are closed, stopping the flow through the adsorber 68. The hydrogen flow valve 15 is opened, allowing hydrogen to flow into the stack.

The first adsorber 16 and the second adsorber 68 are regenerated typically during subsequent operation of the fuel cell stack 34. Accordingly, the adsorber inlet valve 20, adsorber inlet valve 74, and hydrogen flow valve 15 are closed while the adsorber outlet valve 24, the hydrogen shunt valve 28 and the adsorber outlet valve 78 are opened. This facilitates flow of the hydrogen stream 14a from the hydrogen flow line 14, through the hydrogen shunt line 26. A first portion of the hydrogen stream 14b flows to the first adsorber 16, whereas a second portion of the hydrogen stream 14c flows to the second adsorber 68 through the hydrogen shunt line 80 and adsorber inlet line 72, respectively. In the first adsorber 16, oxygen is desorbed from the adsorbent material 17 and flows with the hydrogen stream 14b through the adsorber outlet line 22 and hydrogen flow line 14, respectively, and into the anode side 40 of the fuel cell stack 34. The oxygen/hydrogen stream mixture is discharged from the fuel cell stack 34 through the anode exhaust line 42. Likewise, in the second adsorber 68, oxygen is desorbed from the adsorbent material 70 and flows with the hydrogen stream 14c through the adsorber outlet line 76 and hydrogen flow line 14, respectively, and into the anode side 40 of the fuel cell stack 34, from which the oxygen/hydrogen stream mixture is discharged through the anode exhaust line 42. During re-generation, heat 31 may be applied to the adsorbent material 17 and adsorbent material 70 to aid in the oxygen desorption process.

While exemplary embodiments of the invention have been described above, it will be recognized and understood that various modifications can be made in the invention and the appended claims are intended to cover all such modifications which may fall within the spirit and scope of the invention.

What is claimed is:

1. A method of purging residual hydrogen from a hydrogen fuel cell stack, comprising:
   providing an air stream;
   providing an adsorbent material comprising CeO;
   providing a nitrogen stream by removing oxygen from said air stream by passing said air stream through said adsorbent material; and
   passing said nitrogen stream through said fuel cell stack anode.

2. The method of claim 1 further comprising re-generating said adsorbent material by providing a hydrogen stream and passing said hydrogen stream through said adsorbent material.

3. The method of claim 2 wherein said passing said nitrogen stream through said fuel cell stack anode comprises passing said nitrogen stream through said fuel cell stack anode after shutdown of said fuel cell stack.

4. The method of claim 2 wherein said passing said hydrogen stream through said adsorbent material comprises passing said hydrogen stream through said adsorbent material after shutdown of said fuel cell stack.

5. The method of claim 2 further comprising flowing a stream exiting the adsorbent material through said fuel cell stack.

6. The method of claim 2 further comprising heating said adsorbent material during said passing said hydrogen stream through said adsorbent material.

7. The method of claim 2 wherein said passing said air stream through said adsorbent material comprises passing said air stream through said adsorbent material during start-up of said fuel cell stack.

8. The method of claim 7 wherein said re-generating said adsorbent material comprises re-generating said adsorbent material after startup of said fuel cell stack.

9. The method of claim 2 further comprising heating said adsorbent material during said passing said hydrogen stream through said adsorbent material.

10. The method of claim 1 wherein said adsorbent material further comprises a catalyst capable of accelerating reactions on CeO.

11. A method of purging residual hydrogen from a fuel cell stack anode, comprising;
   providing an air stream;
   providing an oxygen adsorbent material capable of removing at least a substantial portion of oxygen from an air stream to provide substantially a nitrogen stream;
   providing a nitrogen stream by passing said air stream through said adsorbent material;
   passing said nitrogen stream through said fuel cell stack; and
   re-generating said oxygen adsorbent material by providing cathode exhaust from said fuel cell stack and passing said cathode exhaust through said adsorbent material before venting cathode exhaust.

12. The method of claim 11 wherein said adsorbent material comprises CeO.

13. The method of claim 11 further comprising heating said adsorbent material during said passing said cathode exhaust through said adsorbent material.

14. A method of purging residual hydrogen from a hydrogen fuel cell stack anode, comprising:
   providing an air stream;
   providing a first adsorbent material and a second adsorbent material; each of said first and second adsorbent materials is capable of removing a substantial portion of oxygen from an air stream to provide substantially a nitrogen stream;
   providing a first nitrogen stream by passing said air stream through said first adsorbent material and passing said first nitrogen stream through said fuel cell stack during shutdown of said fuel cell stack;
   providing a second nitrogen stream by passing said air stream through said second adsorbent material and passing said second nitrogen stream through said fuel cell stack during start-up of said fuel cell stack; and
   re-generating said first adsorbent material and said second adsorbent material by providing a hydrogen stream and passing said hydrogen stream through said first adsorbent material and said second adsorbent material, respectively.

15. The method of claim 14 wherein said hydrogen stream is vented from the first adsorbent material and second adsorbent material through said fuel cell stack.

16. The method of claim 14 wherein said first adsorbent material and said second adsorbent material each comprises at least one of a carbon structure, carbon molecular sieve, a zeolite, CeO or an oxygen adsorbing material.

17. The method of claim 14 further comprising heating said first adsorbent material and said second adsorbent material during said passing said hydrogen stream through said first adsorbent material and said second adsorbent material.

* * * * *